United States Patent
Son

(10) Patent No.: US 10,093,813 B2
(45) Date of Patent: Oct. 9, 2018

(54) FLAME RETARDANT COMPOSITION FOR WOOD, FLAME RETARDANT WOOD, AND METHOD FOR MANUFACTURING THE SAME

(71) Applicant: National Institute of Forest Science, Seoul (KR)

(72) Inventor: Dong-won Son, Seoul (KR)

(*) Notice: Subject to any disclaimer, the term of this patent is extended or adjusted under 35 U.S.C. 154(b) by 141 days.

(21) Appl. No.: 15/070,165

(22) Filed: Mar. 15, 2016

(65) Prior Publication Data

US 2017/0267873 A1 Sep. 21, 2017

(51) Int. Cl.
*C09D 5/18* (2006.01)
*B27K 3/16* (2006.01)
*B27K 3/20* (2006.01)

(52) U.S. Cl.
CPC ............... *C09D 5/18* (2013.01); *B27K 3/163* (2013.01); *B27K 3/20* (2013.01); *B27K 2240/30* (2013.01)

(58) Field of Classification Search
CPC . C09D 5/18; B27K 3/20; B27K 3/163; B27K 2240/30
See application file for complete search history.

(56) References Cited

U.S. PATENT DOCUMENTS

| | | | | |
|---|---|---|---|---|
| 4,725,382 A | * | 2/1988 | Lewchalermwong | ............. C09K 21/04 106/18.13 |
| 5,817,365 A | * | 10/1998 | Richardson | ............ A61B 42/10 2/167 |
| 5,938,824 A | * | 8/1999 | Conradie | ................. B27K 3/52 106/15.05 |
| 9,669,564 B2 | * | 6/2017 | Zhang | ................. B27K 5/0055 |

FOREIGN PATENT DOCUMENTS

| | | | | |
|---|---|---|---|---|
| JP | 2003-226877 | | 8/2003 | |
| JP | 2003-226877 A | * | 8/2003 | ............... B27K 3/32 |
| JP | 2012-81603 | | 4/2012 | |
| KR | 10-1194328 | | 10/2012 | |
| KR | 10-1232274 | | 2/2013 | |
| KR | 10-2015-0124482 A | * | 11/2015 | ............... B27K 3/16 |

OTHER PUBLICATIONS

Formation and preservative effectiveness of inorganic substances in wood treated with potassium carbonate and calcium chloride, Mokchae Konghak 29(2); 126-132, 2001.
English Abstract of 2003-226877 [Aug. 2003].
English Abstract of 2012-81603 [Apr. 2012].
English Specification of 10-1194328 [Oct. 2012].
English Specification of 10-1232274 [Feb. 2013].

\* cited by examiner

*Primary Examiner* — Anthony J Green
(74) *Attorney, Agent, or Firm* — Antonio Ha & U.S. Patent, LLC

(57) ABSTRACT

A flame-retardant composition for wood comprises boric acid, ammonium phosphate dibasic, ammonium borate octahydrate, sodium borate, and a solvent.

5 Claims, 2 Drawing Sheets

FLAME RETARDANT COMPOSITION FOR WOOD, FLAME RETARDANT WOOD, AND METHOD FOR MANUFACTURING THE SAME

TECHNICAL FIELD

Embodiments of the present disclosure concern flame-retardant wood, and more specifically, to flame-retardant compositions for wood, flame-retardant wood plates processed with a flame-retardant composition, and methods for preparing name-retardant wood plates.

DISCUSSION OF RELATED ART

Wood is gaining popularity as building materials in light of being eco-friendly material and presenting an aesthetic design.

However, wood is vulnerable to fire. Various approaches are being attempted and introduced to address such issue.

SUMMARY

According to embodiments of the present disclosure, there are provided a flame-retardant composition that is applied to wood plates to allow them enhanced flame-retardant effects, a wood plate processed by the flame-retardant composition, and a method for preparing the flame-retardant composition.

According to an embodiment of the present disclosure, a flame-retardant composition for wood comprises boric acid, ammonium phosphate dibasic, ammonium borate octahydrate, sodium borate, and a solvent.

The solvent may be water.

The flame-retardant composition may comprise 0.4 wt % to 1 wt % of boric acid, 3 wt % to 6 wt % of ammonium phosphate dibasic, 1 wt % to 5 wt % of ammonium borate octahydrate, and 0.5 wt % to 3 wt % of sodium borate.

The flame-retardant composition. May further comprise potassium carbonate or potassium bromide.

The flame-retardant composition may comprise 3 wt % to 6 wt % of potassium carbonate or 3 wt % to 6 wt % of potassium bromide.

The flame-retardant composition may further comprise phosphoric acid.

The flame-retardant composition may comprise 3 wt % to 10 wt % of phosphoric acid.

According to an embodiment of the present disclosure, a method for preparing flame-retardant wood comprises providing a wood plate, preparing a mixture of a flame-retardant agent and a solvent, injecting the mixture into the wood plate at a reduced pressure, and leaving the wood plate at room temperature for a predetermined period of time.

In the method, water may be used as the solvent.

In the method, the flame-retardant agent may comprise boric acid, ammonium phosphate dibasic, ammonium borate octahydrate, and sodium borate.

In the method, the flame-retardant agent may comprise 0.4 wt % to 1 wt % of boric acid, 3 wt % to 6 wt % of ammonium phosphate dibasic, 1 wt % to 5 wt % of ammonium borate octahydrate, and 0.5 wt % to 3 wt % of sodium borate.

In the method, the flame-retardant agent may further comprise potassium carbonate or potassium bromide.

In the method, the flame-retardant composition may comprise 3 to 6 wt % of potassium carbonate or 3 to 6 wt % of potassium bromide.

In the method, the flame-retardant agent may further comprise phosphoric acid.

In the method, the flame-retardant agent may comprise 3 wt % to 10 wt % of phosphoric acid.

In the method, the reduced pressure may last 30 minutes to one hour at 10 kg/cm$^2$ to 25 kg/cm$^2$.

In the method, the wood plate may include one or two selected from the group consisting of a larch plate, a nut pine plate, and a pine plate.

According to an embodiment of the present disclosure, there is provided a flame-retardant wood plate prepared by the above method.

According to an embodiment of the present disclosure, a flame-retardant wood plate includes a wood plate and a flame-retardant composition or agent including boric acid, ammonium phosphate dibasic, ammonium borate octahydrate, sodium borate, and a solvent. The wood plate may be processed by the flame-retardant composition or agent. The flame-retardant composition may be injected into the wood plate, or the flame-retardant composition may be coated or applied to the wood plate.

The solvent may be water. The flame-retardant composition or agent may comprise 0.4 wt % to 1 wt % of boric acid, 3 wt % to 6 wt % of ammonium phosphate dibasic, 1 wt % to 5 wt % of ammonium borate octahydrate, and 0.5 wt % to 3 wt % of sodium borate. The flame-retardant composition or agent may further comprise potassium carbonate or potassium bromide. The flame-retardant composition or agent may comprise 3 wt % to 6 wt % of potassium carbonate or 3 wt % to 6 wt % of potassium bromide. The flame-retardant composition or agent may further comprise phosphoric acid. The flame-retardant composition or agent ma comprise 3 wt % to 10 wt % of phosphoric acid. The wood plate may include, but is not limited to, a piece, plate, or board of larch, nut pine, or pine wood.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED EMBODIMENTS OF EXEMPLARY EMBODIMENTS

Hereinafter, exemplary embodiments of the inventive concept will be described in detail with reference to the accompanying drawings. The inventive concept, however, may be modified in various different ways, and should not be construed as limited to the embodiments set forth herein. As used herein, the singular forms "a" "an," and "the" are intended to include the plural forms as well, unless the context clearly indicates otherwise. It will be understood that when an element or layer is referred to as being "on," "connected to," "coupled to," or "adjacent to" another element or layer, it can be directly on, connected, coupled, or adjacent to the other element or layer, or intervening elements or layers may be present.

The term "flame retardant wood" as used herein may refer to wood (regardless of whether the wood is in the form of a wood plate, beam, board, or timber) treated to have a flame resistant or flame-retardant effect. The term "flame-retardant process" as used herein may refer to treating an object not to be easily burned or flammable to delay the initial fire extinguishing time and fire propagation.

According to an embodiment of the present disclosure, a method for manufacturing a flame-retardant wood plate is described.

Although wood plates are described for purposes of description, embodiments of the present disclosure are not limited thereto and may also apply to timbers, lumbers, boards, or other various types of wood structures. The term "wood plate" may be interchangeably used with the term "wood board."

Figure 1:
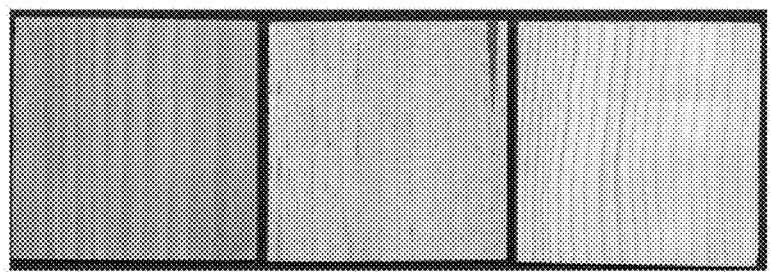
FIG. 1 illustrates flame retardant processed wood plates according to an embodiment of the present disclosure.

FIG. 1 illustrates flame retardant processed wood plates according to an embodiment of the present disclosure. Referring to FIG. 1, there are illustrated various types of wood plates processed with a flame retardant composition according to an embodiment of the present disclosure.

A wood plate is prepared.

The wood plate may be a thin wood plate. As the wood plate, a plate of larch, nut pine tree, or pine tree may be used, but not limited thereto.

The wood plate may be prepared by a log treating process in which a log is cut to a predetermined size and thickness and is dried. The wood plate be processed by a rotary veneer process in which a wood material is peeled off continuously as if a scroll is unrolled, a sliced veneer process in which a wood material is cut along a plane surface, and a sawed veneer process in which a wood material is sawed thin. However, methods for processing the wood plate are not limited thereto, and other various conventional processes may also be adopted.

A mixture of a flame-retardant agent and a solvent are injected into the wood plate at a reduced pressure. As the solvent, water may be used. A primary injection tube may be used to inject the flame-retardant agent into the wood plate at a reduced pressure. The primary injection tube may be a cylinder that is put in a wood material and pressurizes the wood material.

The flame-retardant agent may include boric acid, ammonium phosphate dibasic, ammonium borate octahydrate, and sodium borate.

For example, the flame-retardant agent may contain 0.4 wt % to 1 wt % of boric acid, 3 wt % to 6 wt % of ammonium phosphate dibasic, 1 wt % to 5 wt % of ammonium borate octahydrate, and 0.5 wt % to 3 wt % of sodium borate.

When the content of the flame-retardant agent is less than the lower limit of the range of each element, the flame-retardant agent may not meet a flame-retardant capability standard and thus might not present a flame-retardant function. When the content of the flame-retardant agent is more than the upper limit of the range of each element, a cost rise may occur.

The flame-retardant agent may further include potassium carbonate or potassium bromide.

For example, the flame-retardant agent may include 3 wt % to 6 wt % of potassium carbonate or 3 wt % to 6 wt % of potassium bromide.

When the content of the flame-retardant agent is less than the lower limit of the range of potassium carbonate or potassium bromide, the flame-retardant agent ma not meet the flame-retardant capability standard and thus fail to present a flame-retardant function. When the content of the flame-retardant agent is more than the upper limit of the range of potassium carbonate or potassium bromide, a cost rise may occur.

The flame-retardant agent may further include phosphoric acid. For example, the flame-retardant agent may include 3 wt % to 10 wt % of phosphoric acid.

When the content of the flame-retardant agent is less than the lower limit of the range of phosphoric acid, the flame-retardant agent may not meet the flame-retardant capability standard and thus fail to present a flame-retardant function. When the content of the flame-retardant agent is more than the upper limit of the range of phosphoric acid, a cost rise may occur.

The reduced pressure may be, e.g., 10 $kg/cm^2$ to 25 $kg/cm^2$, and the process at the reduced pressure may be performed for, e.g., 30 minutes to one hour.

When the reduced pressure is less than the lower limit of the range, a fault may occur in injecting the anent into the wood plate, and when the reduced pressure is more than the upper limit of the range, a cost rise may occur.

When the time during which the process at the reduced pressure is less than the lower limit of the time range, an injection failure may occur which leads to a performance deterioration, and when the time is more than the upper limit of the time range, a cost rise may occur.

The wood plate is left at room temperature during a period of time, thereby forming a flame-retardant wood plate. For example, the flame-retardant wood plate may be left at room temperature to be cured for 10 days to 15 days. However, the curing period is not limited thereto, any period during which the process at the reduced pressure may apply so that the flame-retardant wood plate may be used as a wood material.

According to an embodiment of the present disclosure, there is provided flame-retardant wood manufactured by the above-described method for manufacturing flame-retardant wood.

According to art embodiment of the present disclosure, the flame-retardant wood includes boric acid, ammonium phosphate dibasic, ammonium borate octahydrate, sodium borate, and a solvent. The flame-retardant wood may further include potassium carbonate or potassium bromide. The flame-retardant wood may further include phosphoric acid.

According to an embodiment of the present disclosure a flame-retardant composition for wood, flame-retardant wood, and a method for manufacturing the same may enhance flame-retardant capability while overburdening the environment may maintain or reinforce the mechanical and aesthetic property of wood, and may have various applications such as wooden houses.

The present disclosure is described in greater detail in connection with embodiments thereof. The embodiments are provided to more specifically describe the present disclosure, and it should be appreciated by one of ordinary skill in the art that the present disclosure is not limited thereto.

First Embodiment

A flame-retardant composition for wood was prepared that includes 0.4 wt % of boric acid, 3 wt % of ammonium phosphate dibasic, 1 wt % of ammonium borate octahydrate, and 0.5 wt % of sodium borate, and water was used as the solvent.

A pine plate was placed in an injection tube filled with the composition thusly prepared and was subjected to a reduced-press process for one hour at 20 $kg/cm^2$.

The flame-retardant agent (flame-retardant composition) is injected into the pine plate by the reduced-pressure process, and the composition-injected pine plate is left at room temperature for 15 days to be cured, thereby forming a flame-retardant wood plate.

Second Embodiment

A flame-retardant composition for wood was prepared that includes 1 wt % of boric acid, 6 wt % of ammonium phosphate dibasic, 5 wt % of ammonium borate octahydrate, and 3 wt % of sodium borate, and water was used as the solvent.

A pine plate was placed in an injection tube filled with the composition thusly prepared and was subjected to a reduced-press process for one hour at 20 kg/cm².

The flame-retardant agent (flame-retardant composition) is injected into the pine plate by the reduced-pressure process, and the composition-injected-pine plate is left at room temperature for 15 days to be cured, thereby forming a flame-retardant wood plate.

Third Embodiment

A flame-retardant composition for wood was prepared that includes 0.6 wt % of boric acid, 4 wt %, of ammonium phosphate dibasic, 2 wt % of ammonium borate octahydrate, and 1 wt % of sodium borate, and water was used as the solvent.

A pine plate was placed in an injection tube filled with the composition thusly prepared and was subjected to a reduced-press process for one hour at 20 kg/cm².

The flame-retardant agent (flame-retardant composition) is injected into the pine plate by the reduced-pressure process, and the composition-injected pine plate is left at room temperature for 15 days to be cured, thereby forming a flame-retardant wood plate.

Fourth Embodiment

A flame-retardant composition for wood was prepared that includes 0.8 wt % of boric acid, 5 wt % of ammonium phosphate dibasic, 3 wt % of ammonium borate octahydrate, and 2 wt % of sodium borate, and water was used as the solvent.

A pine plate was placed in an injection tube filled with the composition thusly prepared and was subjected to a reduced-press process for one hour at 20 kg/cm².

The flame-retardant agent (flame-retardant composition) is injected into the pine plate by the reduced-pressure process, and the composition-injected pine plate is left at room temperature for 15 days to be cured, thereby forming a flame-retardant wood plate.

Fifth Embodiment

A flame-retardant composition for wood was prepared that includes 0.8 wt % of boric acid, 5 wt % of ammonium phosphate dibasic, 3 wt % of ammonium borate octahydrate, 2 wt % of sodium borate, and 4 wt % of potassium carbonate, and water was used as the solvent.

A pine plate was placed in an injection tube filled with the composition thusly prepared and was subjected to a reduced-press process for one hour at 20 kg/cm².

The flame-retardant agent (flame-retardant composition) is injected into the pine plate by the reduced-pressure process, and the composition-injected pine plate is left at room temperature for 15 days to be cured, thereby forming a flame-retardant wood plate.

Sixth Embodiment

A flame-retardant composition for wood was prepared that includes 0.8 wt % of boric acid, 5 wt % of ammonium phosphate dibasic, 3 wt % of ammonium borate octahydrate, 2 wt % of sodium borate, and 4 wt % of potassium bromide, and water was used as the solvent.

A pine plate was placed in an injection tube filled with the composition thusly prepared and was subjected to a reduced-press process for one hour at 20 kg/cm².

The flame-retardant agent (flame-retardant composition) is injected into the pine plate by the reduced-pressure process, and the composition-injected pine plate is fell at room temperature for 15 days to be cured, thereby forming a flame-retardant wood plate.

Seventh Embodiment

A flame-retardant composition for wood was prepared that includes 0.8 wt % of boric acid, 5 wt % of ammonium phosphate dibasic, 3 wt % of ammonium borate octahydrate, 2 wt % of sodium borate, and 5 wt % of phosphoric acid, and water was used as the solvent.

A pine plate was placed in an injection tube filled with the composition thusly prepared and was subjected to a reduced-press process for one hour at 20 kg/cm².

The flame-retardant agent (flame-retardant composition) is injected into the pine plate by the reduced-pressure process, and the composition-injected pine plate is left at room temperature for 15 days to be cured, thereby forming a flame-retardant wood plate.

Eighth Embodiment

A flame-retardant composition for wood was prepared that includes 0.8 wt % of boric acid, 5 wt % of ammonium phosphate dibasic, 3 wt % of ammonium borate octahydrate, 2 wt % of sodium borate, 4 wt % of potassium carbonate, 4 wt % of potassium bromide, and 5 wt % of potassium carbonate, and water was used as the solvent.

A pine plate was placed in an injection tube filled with the composition thusly prepared and was subjected to a reduced-press process for one hour at 20 kg/cm².

The flame-retardant agent (flame-retardant composition) is injected into the pine plate by the reduced-pressure process, and the composition-injected pine plate is left at room temperature for 15 days to be cured, thereby forming a flame-retardant wood plate.

A flame-retardant wood plate prepared according to the first to eighth embodiments was tested for performance using a cone calorimeter and verified to meet the Class 3 flame-retardant standard. The Class 3 flame-retardant standard ma refer to the condition that a heat release ratio of 200 kW/m² and a total heat release amount of 8 MJ/m² are met when measured for heat of 50 kW for five minutes using a cone calorimeter.

Figure 2:
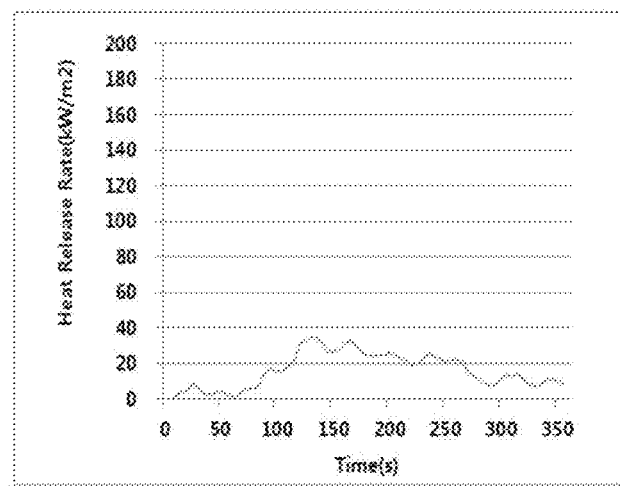
FIG. 2 illustrates a result of a heat dissipation rate performance test for a flame retardant processed wood plate according to an embodiment of the present disclosure.
Figure 3:
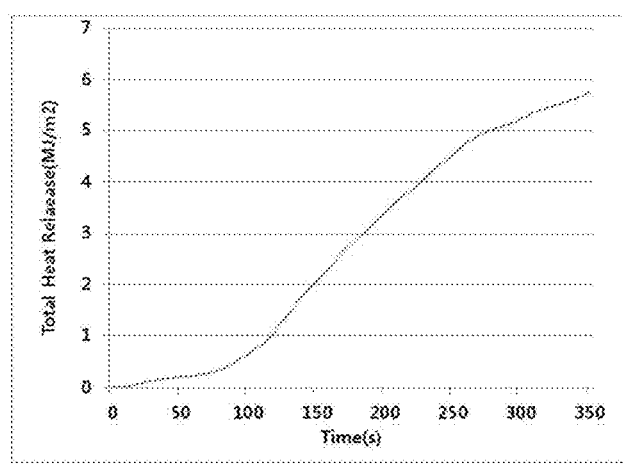
FIG. 3 illustrates a result of a total heat dissipation rate performance test for a flame retardant processed wood plate according to an embodiment of the present disclosure.

A result of performing a performance test, on a flame-retardant wood Plate prepared according the eighth embodiment using a cone calorimeter as suggested in KS F 5660-1 revealed that the flame-retardant wood plate met a heat release ratio of 200 kw/m² or less and a total heat release amount of 8 MJ/m² or less that belong to the Class 3 flame-retardant standard as shown in FIGS. 2 and 3. Accordingly, it was verified that the thermal stability of the flame-retardant wood plate was increased according to time changes, and the effects lasted longer.

While the inventive concept has been shown and described with reference to exemplary embodiments thereof, it will be apparent to those of ordinary skill in the art that various changes in form and detail may be made thereto without departing from the spirit and scope of the inventive concept as defined by the following claims.

What is claimed is:

1. A flame-retardant composition for wood, comprising boric acid, ammonium phosphate dibasic, ammonium borate octahydrate, sodium borate, and a solvent, wherein the solvent is water, and, wherein the flame-retardant composition comprises 0.4 wt % to 1 wt % of boric acid, 3 wt % to 6 wt % of ammonium phosphate dibasic, 1 wt % to 5 wt % of ammonium borate octahydrate, and 0.5 wt % to 3 wt % of sodium borate.

2. The flame-retardant composition of claim 1, further comprising potassium carbonate or potassium bromide.

3. The flame-retardant composition of claim 2, wherein the flame-retardant composition comprises 3 wt % to 6 wt % of potassium carbonate or 3 wt % to 6 wt % of potassium bromide.

4. The flame-retardant composition of claim 1, further comprising phosphoric acid.

5. The flame-retardant composition of claim 4, wherein the flame-retardant composition comprises 3 wt % to 10 wt % of phosphoric acid.

* * * * *